S. P. GRIFFIN.
CAPSTAN.
APPLICATION FILED OCT. 28, 1919.

1,372,019.

Patented Mar. 22, 1921.
3 SHEETS—SHEET 1.

WITNESS:
Thos. W. Riley

INVENTOR.
S. P. Griffin
BY
H. J. Fitz Gerald & Co.
ATTORNEY.

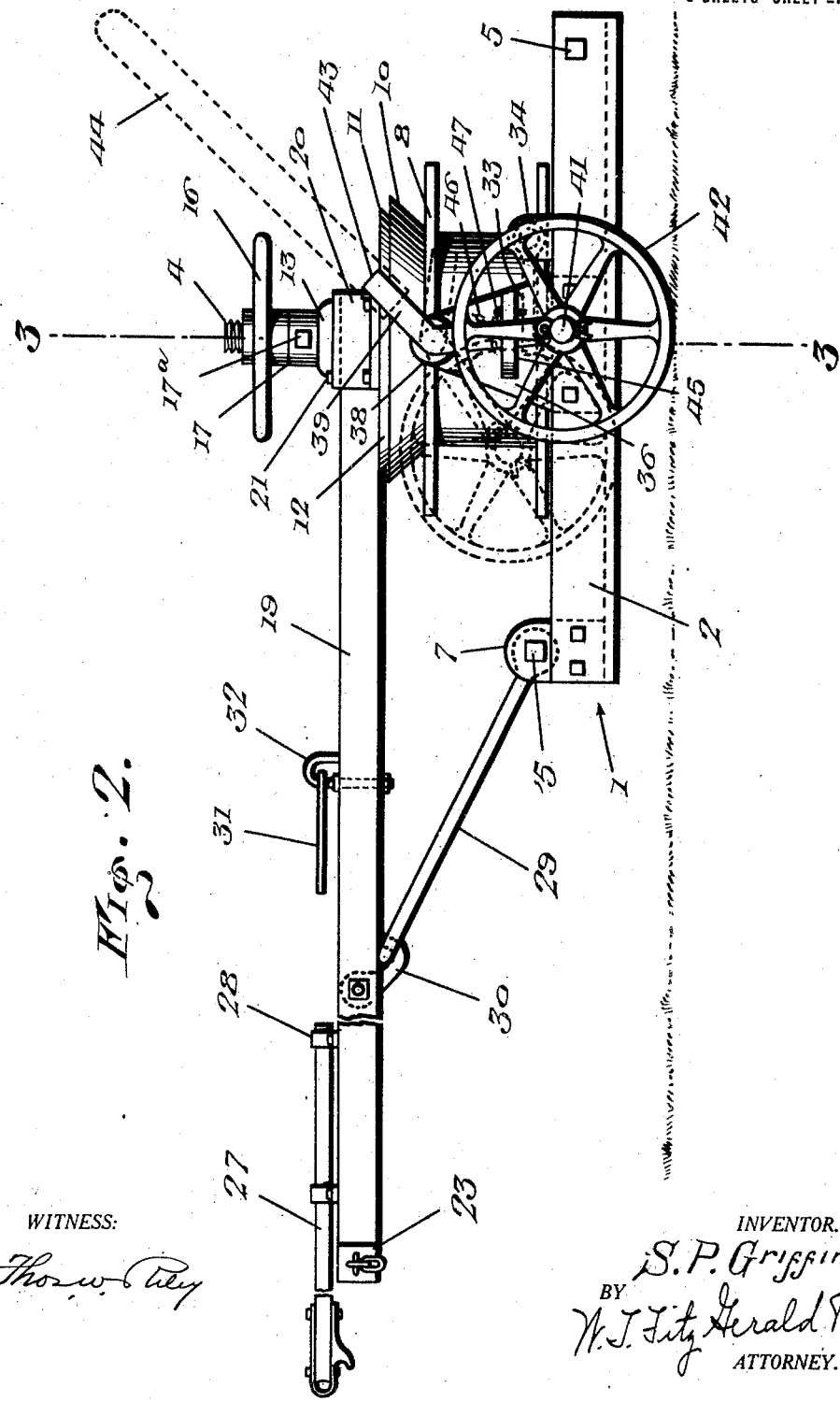

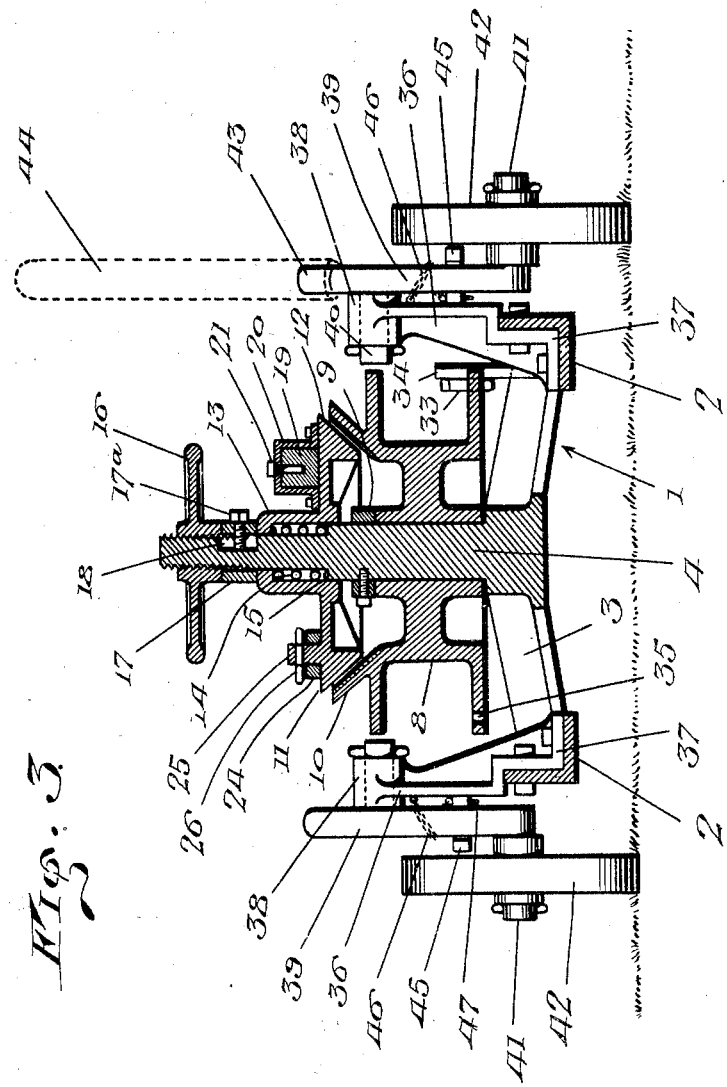

UNITED STATES PATENT OFFICE.

SAMUEL P. GRIFFIN, OF NORTH JUDSON, INDIANA.

CAPSTAN.

1,372,019.     Specification of Letters Patent.     Patented Mar. 22, 1921.

Application filed October 28, 1919. Serial No. 333,963.

*To all whom it may concern:*

Be it known that I, SAMUEL P. GRIFFIN, a citizen of the United States, residing at North Judson, in the county of Starke and State of Indiana, have invented certain new and useful Improvements in Capstans; and I do hereby declare the following to be a full, clear, and exact description of the invention, such as will enable others skilled in the art to which it appertains to make and use the same.

The present invention relates to capstans, such as are used for moving buildings, pulling tree stumps, or otherwise exerting a pulling or lifting force, and the object aims to provide a novel and improved structure of that character possessing a high degree of utility and efficiency.

Another object is the provision of a capstan structure including a drum or spool mounted for rotary movement on a frame, and a sweep with novel means for connecting the sweep to the drum and permitting the drum to be released.

A further object is the provision of a novel sweep construction for the capstan.

A still further object is the provision of novel means for supporting the capstan frame on wheels, so that the structure can be moved about conveniently, and enabling the frame to be let down on the ground.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 2 is a side elevation thereof.

Fig. 3 is a cross section taken on the line 3—3 of Fig. 2, portions being shown in elevation.

Figure 1:
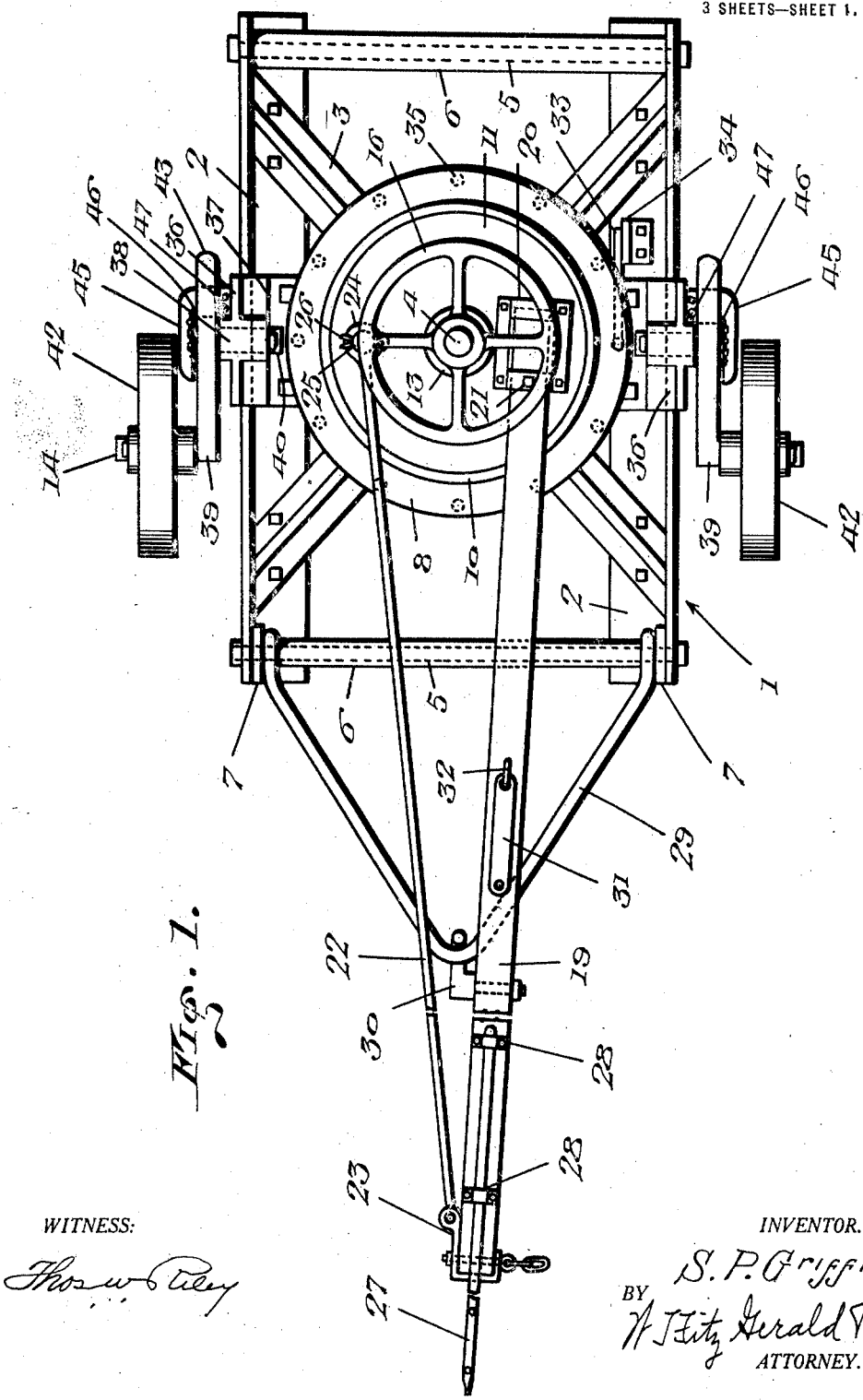
Figure 1 is a plan view of the structure.

In carrying out the invention, there is provided a frame or base 1 composed of parallel longitudinal angle iron side members 2 and an X-shaped casting or member 3 bolted or otherwise fastened on the side members 2. The member 3 is provided at the center thereof with an upstanding spindle 4, and the end portions of the members 2 are connected by cross stays or rods 5 on which spacing sleeves 6 are disposed, the forward stay or rod 5 being carried by upstanding pieces 7 fastened to the forward end of the members 2.

A horizontally-rotating drum or spool 8, having its axis arranged vertically, has its hub mounted for rotation on the spindle 4 and seated on the central portion of the member 3, as seen in Fig. 3, and a collar 9 is secured on the spindle by means of a set screw or the like, to hold the drum down in place. This drum is for the purpose of winding up a cable, rope or the like, used for moving a building, pulling a tree stump, or doing other similar work. The drum is flanged so as to retain the cable or rope thereon, and the top or upper side of the drum has an annular inclined lined flange 10 forming a conical clutch socket. Clutch member or disk 11 is mounted for rotation on the spindle above the drum, and is provided with a beveled or conical periphery, as at 12, to enter and contact frictionally with the flange 10, thereby providing a friction clutch between the member or disk 11 and drum 8. The disk 11 has an upstanding boss 13 fitting slidably at its upper end on the reduced outward terminal of the spindle 4, and housing a coiled wire expansion spring 14 surrounding said spindle and confined between the upper end of the boss and a shoulder 15 on the spindle formed by the upper reduced terminal thereof. This spring 14 therefore exerts a lifting force to raise the disk 11 when it is free to do so, so as to open the clutch. A hand wheel 16 has its hub or central nut screw threaded on the upper reduced terminal of the spindle and bearing on a collar 17 slidable loosely on the spindle and seating on the boss 13. This collar 17 has a set screw 17ª engaging within a longitudinal groove 18 in the spindle, to prevent said collar from turning. The hand wheel 16 can be rotated for either moving the disk or clutch member 11 downwardly into engagement into the flange 10 of the drum, or for releasing the disk 11 so that the spring 14 will lift it out of engagement from the drum, when it is desired to release the drum to permit the cable to unwind, and by regulating the lift of the disk 11 when it is in engagement with the drum, the unwinding movement of the drum can be retarded by friction between the drum and disk. This is of advantage when it is desired to allow the cable to unwind slowly, such as when an object is being lowered or moved down a hill.

A sweep is used for rotating the drum for winding the cable thereon, and comprises the sweep bar 19 of any suitable length having one end fitted within an arched socket member 20 secured on the disk 11 at one side of the center, and said bar is retained in said socket member by means of a pin 21 or the like. A brace rod 22 is used for bracing said sweep bar 19 and has one end connected to a strap or clip 23 secured to the end of the bar 19 opposite the disk 11 and the other end of the rod 22 has an eye 24 fitted over a stud 25 rising from the disk 11 at that side of the center opposite to the socket member 20. The eye or loop 24 is retained on the stud by means of a pin 26 or other retaining member engaging the stud. This brace rod 22 being arranged at an acute angle with the bar 19 and connecting the free end thereof with the disk 11, will take up the strains when the bar 19 is moved around the spindle by the draft animal as usual. A pole 27 is removably inserted in the socket members 28 secured on the bar 19 near the outer end thereof, for hitching the draft animal thereto, and this pole 27 can be removed when not used, as when the device is being moved from place to place.

The sweep bar 19 is also used as a tongue for pulling the device about, and for this purpose V-shaped hound or bail 29 has its ends loosely engaging the forward stay or rod 5 between the ends of the sleeve 6 and pieces 7, and a hook or latch 30 is pivoted to the bar 19 and is swingable into engagement with said hound or bail whereby to prevent the bar 19 from turning relatively to the frame, and to also transmit the draft from said bar to the forward end of the frame 1. A link 31 is loosely engaged with the staple or loop 32 secured to the bar 19 in rear of the hook 30, for the connection of a double tree used for hitching draft animals to the bar or tongue 19, for pulling the device.

A hook-shaped pawl or dog 33 is pivoted to a bearing 34 mounted on one member 2 of the frame, and is engageable with apertures 35 formed in the lower flange of the drum, whereby when the drum is rotated (counter-clockwise in Fig. 1) the pawl or dog will permit the drum to turn, but in dropping in said apertures or openings will prevent the drum from rotating reversely, thereby preventing the cable from unwinding. As seen in dotted lines in Fig. 2, the end of the dog 33 is curved, so as to raise the dog when the drum is rotated in one direction (clockwise in Fig. 1), whereby the dog prevents the drum from rotating in the other direction only. To unwind the cable, however, the bar 19 is moved to forward position, and the hook or latch 30 thereof is engaged with the bail or hound 29, thereby preventing the bar 19 and clutch disk 11 from rotating, and by screwing the hand wheel upwardly, the spring 14 will raise the clutch away from the drum thereby releasing the drum, the pawl or dog 33 having been previously swung rearwardly out of the way, so that the drum can rotate to enable the cable to unwind. By controlling the hand wheel 16, the friction between the clutch disk and drum can be regulated when it is desired to retard the rotation of the drum, or the clutch disk can be permitted to be raised completely away from the drum, so that the drum will be free to turn rapidly if desired.

The frame or base 1 is wheel-mounted in order that it can be conveniently moved about, and the arrangement is such that the frame can be let down onto the ground to avoid tilting or movement when the capstan is in use. For this purpose, a pedestal or standard 36 is provided at each side of the base, and its lower end is formed as at 37, to fit the corresponding angle iron side members 2 between the ends thereof, and is secured thereto in any suitable manner. The pedestals have the bearings 38 at their upper ends, and crank members 39 are disposed at the outer sides of said pedestals and have the angularly-extending journal portions 40 at their upper ends extending through the bearings 38, while said crank members 39 have angularly extending spindles 41 at their lower ends on which the wheels 42 are mounted. The members 39 can therefore swing about a transverse axis for raising and lowering the frame 1, and said members have upwardly projecting extensions 43 for the engagement of a lever or handle member 44 composed of a piece of pipe or the like, whereby to afford the desired leverage or purchase for swinging the members 39. Each pedestal 36 has a hook-shaped seat 45 arranged to receive the corresponding member 39 when it is swung to raise the frame, and this seat 45 serves to limit the movement of the member 39 when it is swung beyond a vertical position or dead-center with the axis of the wheel 42 in the same vertical plane as the journal portion 40. Short chains 46 are connected to the pedestals 36 above the seats 45 and can be passed around the members 39 when they are seated in the seats 45, and said chains have pins 47 to be dropped downwardly through openings in the seats 45 for holding the members 39 therein, thereby preventing accidental movement of said members 39 out of the seats while the device is being moved on the wheels.

When the device has been moved to the place at which it is used, the pins 47 are withdrawn from the seats 45 and the chains 46 removed from around the members 39. Then, by using the lever or handle 44, the members 39 can be swung forwardly out of the seats 45, thereby permitting the frame 1 to drop onto the ground. The capstan can then be used as above indicated for the desired purpose, and when it is to be moved away, members 39 are swung rearwardly by the assistance of the lever or handle 44 to raise the frame, and the chains 46 are again used for holding the parts in position as above described.

Having thus described the invention, what is claimed as new is:—

1. A capstan comprising a frame having an upstanding spindle, a drum rotatable on said spindle, a clutch disk rotatable on the spindle above the drum, said disk and drum having clutch surfaces to have frictional engagement, a sweep bar secured to said disk, spring means for raising the disk away from the drum, and means on the spindle for moving the disk downwardly into engagement with the drum.

2. A capstan comprising a base having an upstanding spindle, a drum rotatable on said spindle and having an upper annular inclined flange, a clutch disk rotatable on the spindle above the drum and having a conical surface to frictionally engage said flange, a sweep bar secured to said disk, spring means for raising the disk away from the drum, and means on the spindle for moving the disk downwardly into engagement with the drum.

3. A capstan comprising a frame having an upstanding spindle, a drum rotatable on the spindle, a clutch disk rotatable on the spindle above the drum, said drum and disk having friction surfaces arranged to contact, the disk having a boss surrounding the spindle, the spindle having a shoulder, a coiled wire expansion spring surrounding the spindle and housed within said boss, said spring being confined between the boss and shoulder for raising the disk away from the drum, a sweep bar secured to said disk, and means on the spindle for moving the disk downwardly into engagement with the drum.

4. A capstan comprising a frame having an upstanding spindle, a drum rotatable on said spindle, a clutch disk rotatable on the spindle above the drum to contact therewith, means on the spindle for moving the disk downwardly into engagement with the drum, a sweep bar secured to said disk, a bail connected to one end of the frame, and means carried by said bar for engaging said bail to prevent the bar from rotating relatively to the frame and to also transmit the draft from the bar to the frame when the bar is used as a tongue for pulling the frame.

5. A capstan comprising a frame, wheels for supporting the frame, the frame having an upstanding spindle, a drum rotatable on the spindle, a clutch rotatable on the spindle above the drum to engage same, means on the spindle for moving the disk downwardly into engagement with the drum, the sweep bar secured to said disk, and means for connecting said bar to one end of the frame to prevent the bar from turning and for transmitting the draft from said bar to said end of the frame when using the bar as a tongue to pull the frame on said wheels.

In testimony whereof I have signed my name to this specification in the presence of two subscribing witnesses.

SAMUEL P. GRIFFIN.

Witnesses:
  HENRY A. SMITH,
  ORA E. SMITH.